United States Patent Office.

IMPROVED MEDICINE FOR HOG CHOLERA.

GEORGE H. BAUGH, OF OSKALOOSA, IOWA.

Letters Patent No. 59,946, dated November 27, 1866.

---

SPECIFICATION

TO ALL WHOM IT MAY CONCERN:

Be it known that I, GEORGE H. BAUGH, of Oskaloosa, in the county of Mahaska, and State of Iowa, have invented a new and useful Medical Compound for the Cure of Hog Cholera; and I do hereby declare the following to be a full, clear, and exact description of the ingredients, and the mode of compounding the same, sufficient to enable one skilled in the mode of compounding prescriptions to make and use the same.

The remedy is composed of the following ingredients: saltpetre, 2 oz.; indigo, 2 oz.; copperas, 3 oz.; cayenne pepper, 2 oz.; allspice, 2 oz.; sulphur, 3 oz.; Spanish brown, 3 oz.; turpentine, 3 oz.; black antimony, 2 oz.; oil of sassafras, 2 oz.—24 oz. in all. These ingredients are mixed intimately, and kept in stoppered or close vessels, being administered to hogs in their food, or in a mash, in quantities as follows:

For a sick hog the dose is half an ounce of the compound, to be given as often as necessary, say every half hour. The dose must be repeated until the desired effect is produced. Occasional small doses, while in apparent health, will prevent attacks of the disease.

What I claim as new, and desire to secure by Letters Patent, is—

The compound, substantially as above specified, as a medicine for the cure of hog cholera.

GEORGE H. BAUGH.

Witnesses:
JOHN F. LACEY,
W. E. SHEPHERD.